UNITED STATES PATENT OFFICE.

ARTHUR L. BROWN, OF WILKINSBURG, PENNSYLVANIA, ASSIGNOR TO WESTINGHOUSE ELECTRIC AND MANUFACTURING COMPANY, A CORPORATION OF PENNSYLVANIA.

LIQUID COATING COMPOSITION.

1,212,738.     Specification of Letters Patent.     Patented Jan. 16, 1917.

No Drawing.     Application filed December 10, 1914. Serial No. 876,437.

*To all whom it may concern:*

Be it known that I, ARTHUR L. BROWN, a citizen of the United States, and a resident of Wilkinsburg, in the county of Allegheny and State of Pennsylvania, have invented a new and useful Improvement in Liquid Coating Compositions, of which the following is a specification.

My invention relates to liquid coating compositions and processes of producing them, and it has special reference to the production of varnishes and enamels containing phenolic condensation products and drying oils.

The object of my invention is to prepare liquid coating compositions of the above-indicated class which shall be composed of cheap and readily obtainable ingredients and which shall possess special properties rendering them highly advantageous for general use as varnishes and enamels, and particularly for use as electrical-insulating material.

Numerous attempts have heretofore been made to prepare varnishes and enamels containing phenolic condensation products, of the general type of bakelite, associated with the usual drying oils and solvents. Such attempts have been unsuccessful, however, because it has been the practice to form a phenolic condensation product by reaction between a phenolic body and formaldehyde or its equivalent and to add the other ingredients of the varnish after the condensation reaction has taken place. Under these conditions, the drying oils will not mingle satisfactorily with the condensation products. I have found that, if a drying oil, together with a suitable drier, is mixed with the uncombined ingredients of a phenolic condensation product, such, for example, as cresol and formaldehyde, and the mixture is heated, the materials combine to form a highly efficient varnish composition. The reaction which takes place between the phenolic body and the formaldehyde may or may not be the well known bakelite reaction. On account of the relatively small amounts of phenolic substance and formaldehyde that I employ, it seems likely that the reaction which takes place in my process is different from the bakelite reaction, but whatever this reaction may be, a homogeneous product is produced which possesses greatly superior properties, in comparison with the varnishes and enamels heretofore in use.

According to one modification of my present invention, I make use of cresol, formaldehyde, Chinese wood oil, (tung oil) and a varnish drier containing a lead-manganese resinate and tungate. I have found that a suitable drier for my purpose is that sold commercially as Tox tungate solid, which is a mixture of lead-manganese tungate and lead-manganese resinate. The following is an illustrative example of a method of carrying out my process. I have found that the ingredients, proportions and temperatures therein stated are well adapted for this purpose and give excellent results, but I do not desire to be restricted to their use. Twelve parts of raw Chinese wood oil and one and one-half parts of Tox tungate solid drier are heated in an open kettle to 180—190° C. as rapidly as possible and maintained at that temperature for about fifteen minutes. The liquid is then allowed to cool to 100° C. Four parts of cresol are added and stirred in well with the oil, and finally three parts of formalin, (a 40% aqueous solution of formaldehyde) are added. The temperature of the mixture is maintained at 95—100° C. for one hour, and the liquid is stirred at frequent intervals, in order to avoid bumping which may result from the boiling of the water added with the formaldehyde. After one hour, most of the water should be evaporated, which will be indicated by a rise in temperature above 100° C. At this point, the heating should be stopped and the mixture be permitted to stand for several hours, conveniently over night. After the formaldehyde solution has been added, a reflux air condenser may be attached to the kettle and the temperature maintained at 95—100° C. for one hour. The reflux air condenser is then removed, and the temperature is maintained at 95—100° C. for another hour, or until most of the water has disappeared. The only object in using a reflux air condenser is to give the mixture a longer treatment with the formaldehyde solution. I find that satisfactory results may be obtained without this additional apparatus.

The procedure just described results in a liquid which separates into a layer of clear varnish and a layer of precipitated sediment, the latter containing most of the tungate-resinate drier. The wood oil has absorbed a portion of the drier, and the remainder, which has reacted with the formaldehyde present to form an insoluble precipitate, is of no value. The clear liquid is decanted from the precipitated sediment, and heated slowly to 150° C. Higher heating should be avoided and the liquid should be maintained at about 150° C. until the odor of formaldehyde has disappeared.

The composition prepared in the manner described above may be combined with various vehicles, according to the specific use to which the composition is to be applied. If a baking enamel is desired, the vehicle may be naphtha, kerosene or a mixture of equal parts of kerosene and turpentine. I prefer to use either kerosene or the kerosene-turpentine mixture. On account of the fact that the varnish just described contains no hard varnish resins, and may contain unaltered cresol, it does not dry hard in the air without the application of heat. Its best use is therefore found as a baking enamel or varnish. This material is suited to numerous applications, such as a baking enamel for application to metal sheets and wire, including copper and aluminum electrical conducting wires and core plates. I have also found that this varnish is suitable for application to wood as a baking varnish, and baked masses of the varnish may also be employed in making air-tight seals, such as the vacuum seals employed in electric rectifiers. Numerous other applications of the varnish may readily be devised by persons skilled in the art.

While I have set forth my invention by describing a specific process in which cresol, formaldehyde and Chinese wood oil are employed, it is to be understood that my invention is not limited to the use of these substances but also comprehends the use of all substances which act similarly to those specifically mentioned. For example, some other drying oil, such as linseed oil, may be substituted for Chinese wood oil, and phenolic bodies other than cresol may be used with equally good results. Furthermore, the polymers and homologues of formaldehyde may be substituted for formaldehyde without departing from the scope of my invention, and it may sometimes be desirable to select phenolic bodies and dry substances containing active replaceable methylene groups, such as hexamethylene tetramin or the various oxymethylenes, in order to avoid the use of aqueous solutions. In view of the numerous modifications which may be effected in my process without departing from the spirit and scope of my invention, I desire that only such limitations be imposed as are indicated in the appended claims.

I claim as my invention:

1. A liquid coating composition containing a phenolic condensation product and a greater portion of a drying oil.

2. A liquid coating composition containing a phenolic condensation product and an amount of Chinese wood oil, greater than that required to catalytically produce the said condensation product.

3. A liquid coating composition containing a phenolic condensation product, a drier, and a drying oil, the drying oil being present in greater proportion than the condensation product.

4. A liquid coating composition containing a phenolic condensation product, Chinese wood oil and a drier, the Chinese wood oil being present in greater proportion than the condensation product.

5. A liquid coating composition containing a phenolic condensation product, a drying oil, and a lead-manganese drier.

6. A liquid coating composition containing a phenolic condensation product, Chinese wood oil and a lead-manganese drier.

7. A baking enamel containing a phenolic condensation product, a drying oil, a drier, and kerosene, the drying oil constituting at least as great a proportion of the material as the condensation product.

8. A baking enamel containing a phenolic condensation product dissolved in Chinese wood oil, a drier, and kerosene.

9. A baking enamel containing a phenolic condensation product, a drying oil, a lead-manganese drier and kerosene.

10. A baking enamel containing a phenolic condensation product, Chinese wood oil, a lead-manganese drier and kerosene.

11. A baking enamel containing a phenolic condensation product dissolved in a drying oil, a drier, kerosene and turpentine.

12. A baking enamel containing a phenolic condensation product dissolved in Chinese wood oil, a drier, kerosene and turpentine.

13. A baking enamel containing a phenolic condensation product, a drying oil, a lead-manganese drier, kerosene and turpentine.

14. A baking enamel containing a phenolic condensation product, Chinese wood oil, a lead-manganese drier, kerosene and turpentine.

15. A process of preparing liquid coating compositions that comprises mixing the ingredients of a phenolic condensation product with a drying oil and a drier, and heating the mixture.

16. A process of preparing liquid coating compositions that comprises heating the uncombined ingredients of a phenolic condensation product with Chinese wood oil and a drier.

17. A process of preparing liquid coating compositions that comprises heating a mixture of a phenolic substance, a substance containing a reactive methylene group, a drying oil and a drier.

18. A process of preparing liquid coating compositions that comprises heating a mixture of a phenolic substance, a substance containing a reactive methylene group, Chinese wood oil and a drier.

19. A process of preparing liquid coating compositions that comprises heating a mixture of cresol, formalin, a drying oil and a drier.

20. A process of preparing liquid coating compositions that comprises heating a mixture of cresol, formalin, Chinese wood oil and a drier.

21. A process of preparing liquid coating compositions that comprises heating a mixture of cresol, formalin, a drying oil and a lead-manganese drier.

22. A process of preparing liquid coating compositions that comprises heating a mixture of cresol, formalin, Chinese wood oil and a lead-manganese drier.

23. A process of preparing liquid coating compositions that comprises heating a drying oil with a drier at about 180° C., cooling the mixture to about 100° C., adding a phenolic substance and a formaldehyde-liberating substance, and maintaining the mixture at about 100° C. until any water that is present has substantially evaporated.

24. A process of preparing liquid coating compositions that comprises heating a drying oil with a drier at about 180° to 190° C., cooling the mixture to about 100° C., adding a phenolic substance and a formaldehyde-liberating substance, maintaining the mixture at about 100° C. until any water that is present has substantially evaporated, permitting the mixture to separate into layers, decanting the supernatant liquid, and heating it at about 150° C. to expel the free formaldehyde.

25. A process of preparing liquid coating compositions that comprises heating Chinese wood oil with a drier at about 180° to 190° C., cooling the mixture to about 100° C., adding cresol and formalin, and maintaining the mixture at about 100° C. until any water that is present has substantially evaporated.

26. A process of preparing liquid coating compositions that comprises heating Chinese wood oil with a drier at about 180° to 190° C., cooling the mixture to about 100° C., adding cresol and formalin, maintaining the mixture at about 100° C. until any water that is present has substantially evaporated, permitting the mixture to separate into layers, decanting the supernatant liquid, and heating it at about 150° C. to expel the free formaldehyde.

27. A process of preparing liquid coating compositions that comprises heating substantially 12 parts of raw Chinese wood oil and substantially 1½ parts of a lead-manganese drier at about 180° to 190° C. for about fifteen minutes, cooling the liquid to about 100° C., adding substantially four parts of cresol and substantially three parts of formalin, maintaining the mixture at a temperature of about 95° to 100° C. for about one hour, allowing the mixture to settle, decanting the supernatant liquid and heating the same at substantially 150° C. to expel the free formaldehyde.

In testimony whereof, I have hereunto subscribed my name this 28th day of Nov. 1914.

ARTHUR L. BROWN.

Witnesses:
B. B. HINES,
M. C. MERZ.